US010810279B2

(12) United States Patent
Goel et al.

(10) Patent No.: US 10,810,279 B2
(45) Date of Patent: Oct. 20, 2020

(54) CONTENT DELIVERY NETWORK (CDN) PROVIDING ACCELERATED DELIVERY OF EMBEDDED RESOURCES FROM CDN AND THIRD PARTY DOMAINS

(71) Applicant: Akamai Technologies, Inc., Cambridge, MA (US)

(72) Inventors: Utkarsh Goel, San Mateo, CA (US); Moritz Steiner, Sausalito, CA (US); Michael A. Bishop, Bellevue, WA (US); Martin T. Flack, San Francisco, CA (US); Stephen L. Ludin, Mill Valley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 216 days.

(21) Appl. No.: 15/890,626

(22) Filed: Feb. 7, 2018

(65) Prior Publication Data

US 2019/0243924 A1 Aug. 8, 2019

(51) Int. Cl.
*G06F 16/957* (2019.01)
*H04L 29/08* (2006.01)

(52) U.S. Cl.
CPC .......... *G06F 16/9574* (2019.01); *H04L 67/02* (2013.01); *H04L 67/2847* (2013.01); *H04L 67/26* (2013.01); *H04L 67/306* (2013.01)

(58) Field of Classification Search
CPC . G06F 16/9574; H04L 67/02; H04L 67/2847; H04L 67/26; H04L 67/306
USPC ....................................................... 709/219
See application file for complete search history.

(56) References Cited

U.S. PATENT DOCUMENTS

| | | | |
|---|---|---|---|
| 6,820,113 B2 | 11/2004 | Hsu et al. | |
| 7,111,057 B1 | 9/2006 | Wein et al. | |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,376,716 B2 | 5/2008 | Dilley et al. | |

(Continued)

OTHER PUBLICATIONS

Scott Allen, a Software Developer's Guide to HTTP part III—Connections, Jan. 26, 2012, odetocode.com, https://odetocode.com/articles/743.aspx (Year: 2012).*

(Continued)

*Primary Examiner* — Zi Ye (57) ABSTRACT

Among other things, this document describes systems, devices, and methods for improving the delivery of resources embedded on a web page. In one embodiment, a content delivery network analyzes markup language documents that clients have requested to embedded resources, such as linked references to images, scripts, fonts, cascading style sheets, or other types of content. This analysis may be conducted on the content server and/or asynchronously, in a dedicated analytical environment, to produce delivery instructions. Where embedded resources have hostnames for which the content delivery network is authoritative, and where certain conditions are met, servers can be instructed to push additional certificates for such hostnames over the primary connection. When embedded resources have hostnames for which the platform is not authoritative, and where certain conditions are met, servers can be instructed to pre-fetch and push such resources with a signature from the authoritative origin.

18 Claims, 8 Drawing Sheets

(56) References Cited

U.S. PATENT DOCUMENTS

| | | |
|---|---|---|
| 7,472,178 B2 | 12/2008 | Lisiecki et al. |
| 7,660,296 B2 | 2/2010 | Fletcher et al. |
| 8,145,908 B1 | 3/2012 | Liu et al. |
| 8,788,577 B2 | 7/2014 | Podjarny et al. |
| 9,432,353 B2* | 8/2016 | Zmener ............... H04L 63/0892 |
| 9,729,605 B2 | 8/2017 | Gero et al. |
| 9,736,258 B2 | 8/2017 | Holland et al. |
| 9,769,238 B2 | 9/2017 | Ludin et al. |
| 2002/0169961 A1* | 11/2002 | Giles ................... G06F 21/6218 713/175 |
| 2007/0028111 A1* | 2/2007 | Covely ................... G06F 21/51 713/176 |
| 2011/0173345 A1 | 7/2011 | Knox et al. |
| 2013/0191645 A1* | 7/2013 | Richardson ......... H04L 67/1097 713/176 |
| 2013/0198511 A1* | 8/2013 | Yoo ........................ H04L 61/15 713/156 |
| 2014/0164447 A1 | 6/2014 | Tarafdar et al. |
| 2015/0120821 A1* | 4/2015 | Bendell ................ G06F 16/957 709/203 |

OTHER PUBLICATIONS

Alakuijala, IETF, RFC 7932, Brotli Compressed Data Format Jul. 2016, 128 pages.

Bishop, M. et al., Secondary Certificate Authentication in HTTP/2, draft-bishop-httpbis-http2-additional-certs-04, IETF Standards Track Draft published May 19, 2017, 22 pages.

Goel, Utkarsh et al., Measuring What is Not Ours: A Tale of 3rd Party Performance, ACM Passive and Active Measurements Conference (PAM), Mar. 2017, 12 pages.

Wikipedia, Brotli, archived page version published Jan. 14, 2018, 4 pages, downloaded on Mar. 21, 2018, from https://en.wikipedia.org/w/index.php?title=Brotli&oldid=820304359.

Yasskin, J., Origin-signed HTTP Responses, IETF Standards Track Draft Published Dec. 5, 2017, 28 pages.

\* cited by examiner

CONTENT DELIVERY NETWORK (CDN) PROVIDING ACCELERATED DELIVERY OF EMBEDDED RESOURCES FROM CDN AND THIRD PARTY DOMAINS

BACKGROUND

Technical Field

This application relates generally to system and methods for improving the delivery of web content, including in particular embedded resources in a web page.

Brief Description of the Related Art

Content delivery networks (CDNs) are known in the art. Content delivery, networks typically comprise a distributed set of servers that deliver content, e.g., web resources, on behalf of one or more content providers as a service for the content provider. In some cases an entity may build its own content delivery network, in which case the content delivery network service provider and the content provider are one and the same.

Most CDNs, especially multi-tenant CDNs, handle delivery of a large number of websites and even larger number of web resources, such as embedded images, CSS, fonts, scripts, HTML, and the like. This means that the CDN is receiving client requests for content hosted at a large number of disparate hostnames. A content provider allows the CDN to deliver resources authoritatively on its behalf. The CDN typically obtains the resources from the content provider's origin infrastructure, either on-demand or at another time or using another mechanism, and often caches them. Then the CDN delivers the resources according to settings, options, features, and other controls specified by the content provider and typically encompassed in a configuration file stored in the CDN. The configuration file is read and applied to determine how to handle a given content request from a client that is directed to a given customer's hostname. For example, requests for www.customer-1.com are handled in accord with customer-1's configuration choices, while requests for www.customer-2.com are handled in accord with customer-2's configuration choices.

To be able to authenticate itself as an authoritative source of a content provider's content, a CDN has access to a certificate and private key. The certificate and private key are used in establishing a TLS connection between the content delivery network server and the client; the combination of the certificate and the server's possession of the private key vouches for the server as being authoritative for a hostname of the content provider or multiple hostnames (such as a SAN certificate or a wildcard certificate is used) of the content provider.

A web page is generally rendered based on a markup language document and resources, such as images, scripts, CSS, etc., that are embedded in the document, as known in the art. The resources may be embedded with suitable markup language tags and attributes and URL references to the resource. For example, an embedded image might be declared as <img src="www.example.com/logo.gif" alt="Our logo" height="52" width="40">. The resources may or may not be hosted at the same hostname as the markup language document. If the embedded resources are hosted under a different hostname, the CDN may or may not be authoritative for such other hostname and resource. For example, an HTML document located at www.content-provider-A.com/foo.html may have embedded resources located under the same hostname (and thus under the same certificate) as the HTML document, for example www.content-provider-A.com/image.jpg. At the same time, that HTML document also may have embedded resources under a different hostname for a different content provider (and under the same certificate or a different certificate) as the HTML document, e.g., www.content-provider-B.com/image.jpg. Moreover, the CDN may or may not be able to serve content from content-provider-B.

What is needed is a way for a CDN to identify and accelerate the delivery of not only a markup language document but as many embedded resources as possible, preferably in as comprehensive a way as possible, over as few network connections as possible. The teachings hereof address this technical need so as to provide improved computer methods, systems, and apparatus for delivering web pages more quickly and efficiently.

Those skilled in the art will understand these and other improvements from the teachings hereof.

BRIEF SUMMARY

Among other things, this document describes systems, devices, and methods for improving the delivery of embedded resources for a web page. In one embodiment, a content delivery platform analyzes markup language documents that have been requested to find references to embedded resources, such as embedded images, scripts, fonts, cascading style sheets (CSS), or others. This analysis may be conducted asynchronously, in a dedicated analytical environment to produce delivery instructions for platform servers. Where embedded resources have hostnames for which the content delivery platform is authoritative, and when certain conditions are met, servers can be instructed to push additional certificates for such hostnames over the primary connection. When embedded resources have hostnames for which the platform is not authoritative, and when certain conditions are met, servers can be instructed to pre-fetch, early-hint and/or push such resources with a signature from the authoritative origin.

Note that in the above context, the terminology of "being authoritative" for a hostname means being authoritative for delivering content under that hostname (not necessarily being authoritative for DNS resolution of that hostname).

In one embodiment, disclosed herein is a method of improving the delivery of resources embedded in a markup language document, the method performed by one or more servers in a content delivery network that is authoritative for a plurality of hostnames. The method involves receiving, via an HTTP connection, a request from a client for a markup language document, the request directed to a first URL comprising a first hostname, the HTTP connection being HTTP (e.g., 1.1 or 2 or other) over a transport layer protocol (e.g., TCP or QUIC or UDP). The method further involves fetching the markup language document from a first origin server, and analyzing the markup language document. The analysis can involve parsing the markup language document to find a first embedded resource identified by a second URL comprising a second hostname, and to find a second embedded resource identified by a third URL comprising a third hostname. The analysis can further involve determining whether the content delivery network is authoritative for the second hostname, and determining whether the content delivery network is authoritative for the third hostname. If the content delivery network is authoritative for the second hostname, the method can involve pushing a certificate for the second hostname to the client over the HTTP connection.

If the content delivery network is not authoritative for the third hostname (because it is a third party site, for example), and based at least in part on the second embedded resource meeting one or more conditions, the method can involve fetching the second embedded resource from a second origin server and pushing the second embedded resource to the client over the HTTP connection along with a signature from the second origin server authenticating the second embedded resource.

The method can be performed by a server or set of servers in the content delivery network. Hence, in the above scenario, a content delivery network server can push a certificate for an embedded resource (referred to in this example as the first embedded resource on the second hostname) and can deliver third party embedded resource (referred to in this example as the second embedded resources on the third hostname).

The foregoing is a description of certain aspects of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function; manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

The terms 'object' and 'resource' are used interchangeably in this pa en document.

The terms 'domain name' and 'hostname' are used interchangeably in this patent document.

Introduction

The teachings of this patent document relate to, among other things, improved delivery of resources embedded in a markup language document. Preferably, the teachings hereof are used to improve HTTP/2 server push strategies and/or early hint strategies for embedded resources. Notably, these resources may include not only resources associated with the same domain as the markup language document, but also resources associated with other domains, including domains of both content provider customers of the CDN and content providers that are not customers of the CDN. The 'non-customer' category is referred to herein as 'third party' content delivery. Third party content delivery typically is a scenario in which a CDN is acting to accelerate the delivery of a web page for its customer by delivering third party resources that the customer has embedded on their web page, even though the CDN has no formal relationship with the third party and is not authoritative for those embedded resources.

Preferred embodiments herein leverage techniques described in 'Secondary Certificate Authentication in HTTP/2', which is set forth in an IETF document titled draft-ietf-httpbis-http2-secondary-certs-00 (hereinafter Bishop et al.) and 'Origin-signed HTTP Responses', set forth in an IETF document titled draft-yasskin-http-origin-signed-responses-01 (hereinafter Yasskin et al.).

Secondary Certificate Authentication in HTTP/2 is an active-work in the IETF HTTP Working Group that allows web servers to present additional certificates over an existing MS session. Clients and servers that support the specifics described in the draft can eliminate round trips needed to establish TCP connections and TLS sessions for any hostname presented in additional (SAN or wildcard) certificates. The specifics described in the draft could also be used by intermediate proxies that are authoritative for many hostnames embedded in an HTML document.

According to the teachings hereof, a content server in a CDN upon request from a client can fetch an HTML document from an origin server (or the content server can fetch it from its document cache, if present in a valid state) and parse it to identify all those hostnames for which the content server can and will likely act as an authoritative server. Once all such hostnames are identified, the CDN content server can transmit one or more HTTP/2 ORIGIN frames to announce hostnames and push certificates needed for such hostnames. Any client advertising support for secondary certificates via an option in the HTTP/2 SETTINGS frame can choose to coalesce subsequent requests to hostnames advertised in the certificated to an existing TLS session and experience performance improvements.

For resources embedded in the HTML for which the content server cannot act as an authority, such as third-party objects, the content server can leverage the mechanism described in Yasskin et al. to push origin-signed responses to the client browser. For example, the content server, upon request from the client, can fetch an HTML document from the origin server (or the content server can fetch the document from its document cache, if the document is present in a valid state), and parse it to identify all third party resources. For all identified third-party resources, the server can pull an set of instructions from a service that performs offline analysis of HTML pages to identify cacheable third-party assets that meet certain conditions. Such offline analysis can involve periodic parsing of HTML documents, followed by making requests to the embedded resources identified in the HTML. Instead or additionally, the offline analysis of the HTML document could involve examining HTTP logs or Resource Timing (RT) to identify all resources linked from an HTML document or its sub-resources. (RT data can be obtained using the techniques described in U.S. Pat. No. 9,736,258, the teachings of which are hereby incorporated by reference in their entirety.) Alternatively, such analysis could also be performed via configuring a WebPageTest instance onto a CDN's internal network that parses all the customer webpages.

In summary of the above, the delivery of embedded resources that the CDN can serve authoritatively can be improved by presenting additional certificates over the existing TLS connection, in the manner described in Bishop et al. The delivery of embedded resources that the CDN cannot serve authoritatively (e.g., the third party resources) can be improved by fetching and serving those resources as origin-signed objects, in the manner described in Yasskin et al. With the foregoing by way of introduction, detailed teachings are now provided.

System

Figure 1:
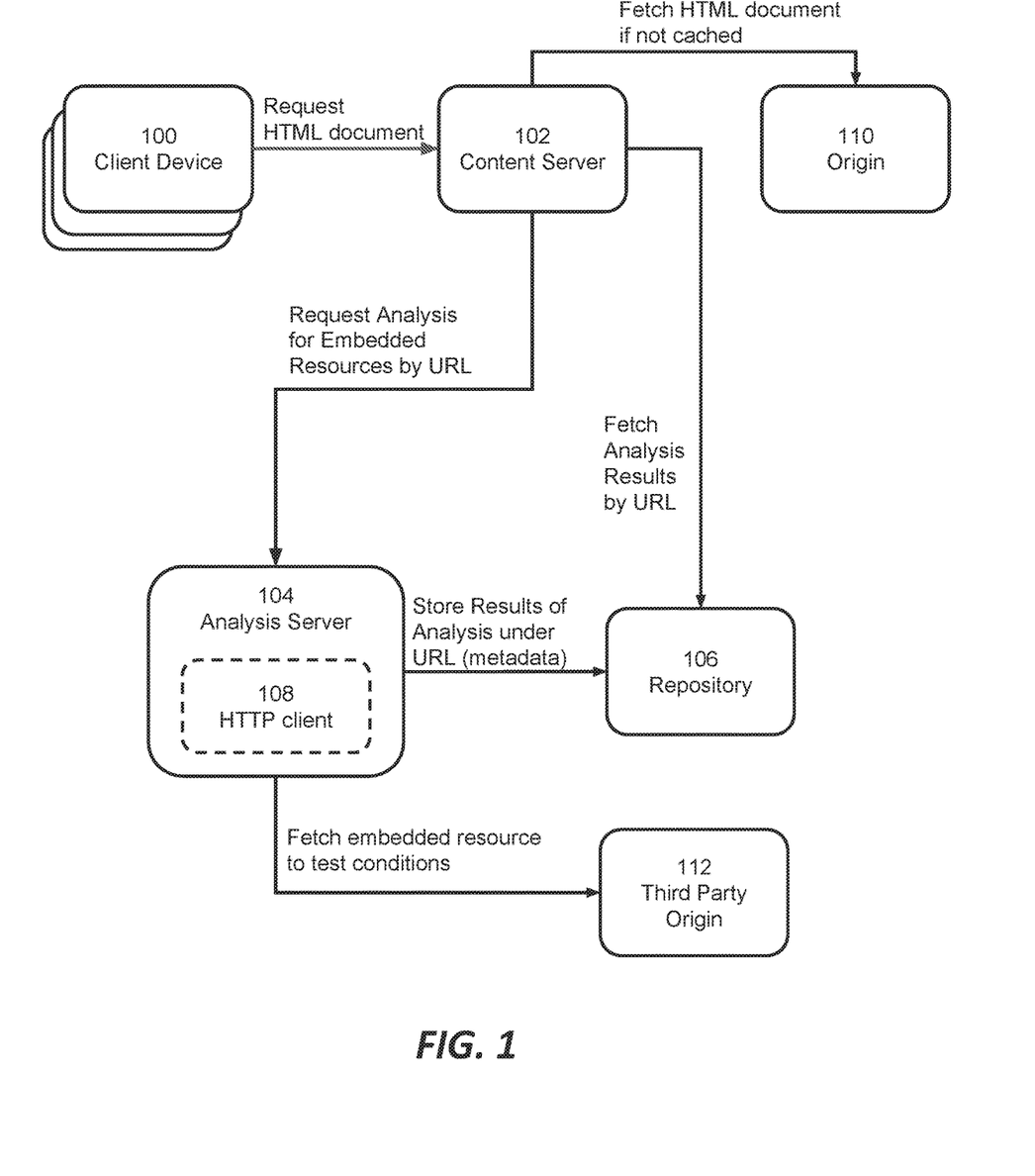
FIG. 1 is a diagram illustrating a system for accelerating delivery of embedded resources, in one embodiment.

FIG. 1 provides a diagram of one embodiment of a system. The system could be adapted for any markup language or presentation layer document that has embedded resources. A client device 100 issues requests (e.g., HTTP/2 'GET' requests) to the content server 102 for an HTML document in a known manner. The content server 102, which preferably is a caching reverse proxy server in a content delivery network (CDN), retrieves the HTML document from an origin server 110 in a forward request operation, as known in the art.

The content server 102 analyzes the HTML document before serving it to the client. More specifically, the content server 102 parses the HTML to find references to embedded resources therein. Embedded resources typically include images, iframes, scripts, CSS, fonts, and other resources, and they are identified by a suitable HTML tag and a URL that is used to locate the resource on a remote origin server.

In general, the content server 102 conducts the analysis by examining the URL of each embedded resource it finds in the HTML document and classifies it as falling into one of four categories. The categories are as follows:

Category 1: Same certificate. The embedded resource is located under a hostname covered by the initial certificate—that is, the certificate used to establish the HTTP/2 connection with the content server 102 to request the HTML document. (This may be because the certificate is a wildcard or SAN certificate that covers the hostname, or for other reasons.)

Category 2: Different certificate, CDN authoritative, and embedded resource meets certain additional conditions. In this case the embedded resource is located under a hostname that is not covered by the original certificate, but the CDN does have a configuration and applicable certificate for the hostname. This means that the CDN is an authoritative source of the embedded resource and may be able to serve it on behalf of some content provider other than the content provider of the HTML (depending on certain conditions being met). In short, the resource is from another customer of the CDN. Given a large multi-tenant CDN, many embedded resources may fall under this category. In one embodiment, the content server 102 can determine whether the CDN is handling the hostname by performing a DNS resolution on the name, and walking a CNAME chain to see if an alias to a CDN-related hostname is present in the DNS records. This process is described in U.S. Pat. No. 9,769,238, the teachings of which are hereby incorporated by reference in their entirety. In addition, to be in category 2, the embedded resource preferably meets certain conditions, which will be described later in this patent document.

Category 3: Different certificate, CDN not authoritative, and embedded resource meets certain additional conditions. In this case, the embedded resource is located under a hostname that is not covered by the original certificate, and the CDN does not have an applicable certificate for the hostname. This means that the embedded resource is third party content. However, the third party embedded resource preferably must meet certain conditions to fall into this category. Preferably, the content server 102 consults a record for an instruction set stored in the repository 106 for a given embedded resource to determine whether the embedded resource meets the conditions. If no instruction set for the embedded resource has been created yet, the conditions are not met and the content server 102 requests that the analysis server 104 analyze the embedded resource to determine if meets the conditions and to create such instruction set.

Typical examples of third party resources that might meet the conditions are third-party fonts, JavaScript, CSS, SVG, images, XML, JSON, AJAX content, and iframe HTML.

Additional Conditions for Category 2

In a preferred embodiment the content server 102 is configured to apply certain conditions to embedded resources for which is it authoritative before they can be treated as category 2. While the conditions will vary with the implementation, an example set of conditions are as follows:

a. the CDN-related hostname by walking a CNAME chain belongs to an active CDN customer configuration on the content server 102 b. client requests for content under the hostname are allowed to be served, e.g., the content is allowed to be served in the country where the request originated and/or the client location and/or client's network/carrier c. requests for content under the hostname could be served from the content server 102 to which the client is already connected d. the CDN customer configurations (e.g. TLS cipher profiles) allow the CDN to advertise support for the hostname to be coalesced onto another connection Additional Conditions for Category 3 & Offline Analysis A preferred embodiment of the asynchronous (offline) analysis conducted by the analysis server 104 is now described. In this embodiment, the analysis examines the third party embedded resource to determine if it meets the conditions for category (3) above. It is noted that term 'asynchronous' here means asynchronous to the request/response message exchange between the client 100 and content server 102 for the HTML document. Preferably, the resource must meet all of the following conditions to fall within category (3):

a. a request for the embedded resource returns an HTTP 200 'OK' header;

b. the embedded resource has a time to live (TTL) equal or higher to a minimum threshold (e.g., max-age is 3600 seconds). The threshold could be set to any positive number expressing a number of seconds. In some configurations, the threshold can be set to be in a range of 43200 to 86400 seconds (i.e., 12 to 24 hours), or even longer or shorter than 360 seconds;

c. the embedded resource can be cached in a shared cache (e.g., not private, no-cache, or no-store content);

d. client requests for content under the hostname are allowed to be served, e.g., the content is allowed to be served in the country where the request originated and/or the client location and/or client's network/carrier;

e. a request for the embedded resource does not return cookies or other evidence of personalization, and the request does not fail for lack of sending cookies;

f. the origin server for the embedded resource is signing the resource as specified in Yasskin et al.; put another way, the origin-signed responses protocol of Yasskin et al. is supported by the origin server; and, g. a request for the embedded resource does not include a 'Vary' HTTP header.

As those skilled in the art will understand, the above conditions are not required for every embodiment; rather the particular list of factors will vary with the implementation and use case.

To assess these conditions, the analysis server 104 requests each third party embedded resource from its origin server, by resolving (for each third party embedded resource) the domain name to an IP address of the third party origin server. The analysis server 104 sends a HEAD request to the IP address determine whether that third party origin server supports origin signed responses. If it can, then the analysis server 104 sends an HTTP 'GET' request to the third party origin server. To protect against receiving personalized or private content from the third party origin server, the analysis server 104 preferably sends no cookies with this request. Upon receiving a response from the origin server for the particular embedded resource, the analysis server 104 can examine the HTTP headers received with the resource. The analysis server 104 then creates a instruction set indicating the results for that resource and stores it in the repository 106 under the URL for the embedded resource. As mentioned above, the content server 102 can consult this information to determine the proper category for a given embedded resource. Preferably the instruction set is given a time to live (TTL) so that periodically the instruction set expires and the analysis updated. In some embodiments, if the offline analysis reveals that the conditions are met, then the analysis server 104 can prefetch and cache the objects in the CDN infrastructure.

An example of a system for performing 'offline' analysis of a web page is described in U.S. Pat. No. 8,788,577, the teachings of which are hereby incorporated by reference in their entirety. That system can be used to implement the above offline analysis.

An embodiment of the operation of the content server 102, after determining the category of each embedded resource in the HTML document, is now described.

For an embedded resource that is Category 1 'Same certificate', no additional treatment is needed: the content server 102 can serve or push the embedded resource in a conventional manner.

For an embedded resource that is Category 2 'Different certificate, CDN authoritative, and conditions met': the content server 102 obtains the certificate for the hostname of the embedded resource, and advertises the certificate to the client using the teachings described in the IETF draft of Bishop et al. The content server might employ server push or simply permit the client to request the resource using the existing certificate.

For an embedded resource that is Category 3 'Different certificate, CDN not authoritative, and conditions met': the content server can implement a signed object delivery process. This can involve:

The content server 102 modifies the reference to such embedded resource in the HTML document by adding a 'physicalsrc', which can point to a URL with a hostname that is the same hostname as that of the basepage (e.g., the hostname advertised in the SNI host during TLS handshake or obtained in another way), a predetermined hostname, or one generated on the fly. Note that the use of 'physicalsrc' is but one implementation; any attribute/information added the to the HTML: can be used to advertise the origin-signed responses. Further, a distinct message (e.g., HTTP/2 frame or otherwise) could be sent by the content server 102 to the client to advertise the fact that origin-signed responses are available to the client on the CDN.

The content server 102, prefetches and caches the embedded resource from the third party origin 112 in the content server 102 or other CDN infrastructure, if not already performed by the analysis server 104 as part of the offline process.

The content server 102 can then send an HTTP/2 push promise frame for the signed resource, and ultimately pushes the resource itself. The resource is signed in accordance with the teachings of Yasskin et al.

In some embodiments, in an alternative to adding the physicalsrc attribute and pushing the resource using HTTP/2, the content server 102 can add the physicalsrc attribute and send an early hint for the signed third party resource as being on a CDN hostname. This involves adding an early hint in accord with the techniques and protocols described in RFC 8297. This alternate embodiment is particularly preferred, but not restricted to, when the connection is an HTTP 1.1 connection, such that HTTP/2 server pushes are not supported. They are also particularly useful (without limitation) in HTTP/QUIC implementations. Note that the accelerated delivery of some web pages may involve both server push (i.e., for some embedded resources) and early hint (for other embedded resources)

In yet another embodiment, the content server 102 can add preload attributes (i.e., with references to the signed third party resources) to the header in the HTTP response.

In all the above three cases of delivering the origin-signed response to the client (push, early hint, and preload headers in the HTTP response), the objects signed by third-party origins will likely point to a hostname for which the CDN server already sent a certificate, either during the initial TLS handshake or during the transmission of additional certificates.

In an alternate embodiment, instead of relying on the origin to sign the content as in Yasskin et al., a CDN could also arrange for a contract with third-party vendors that allows the CDN to become a signing authority for such third-party resources.

For an embedded resource that did not meet qualify for Category 1, Category 2, or Category 3, the content server 102 leaves the embedded resource unchanged.

Figure 2A:
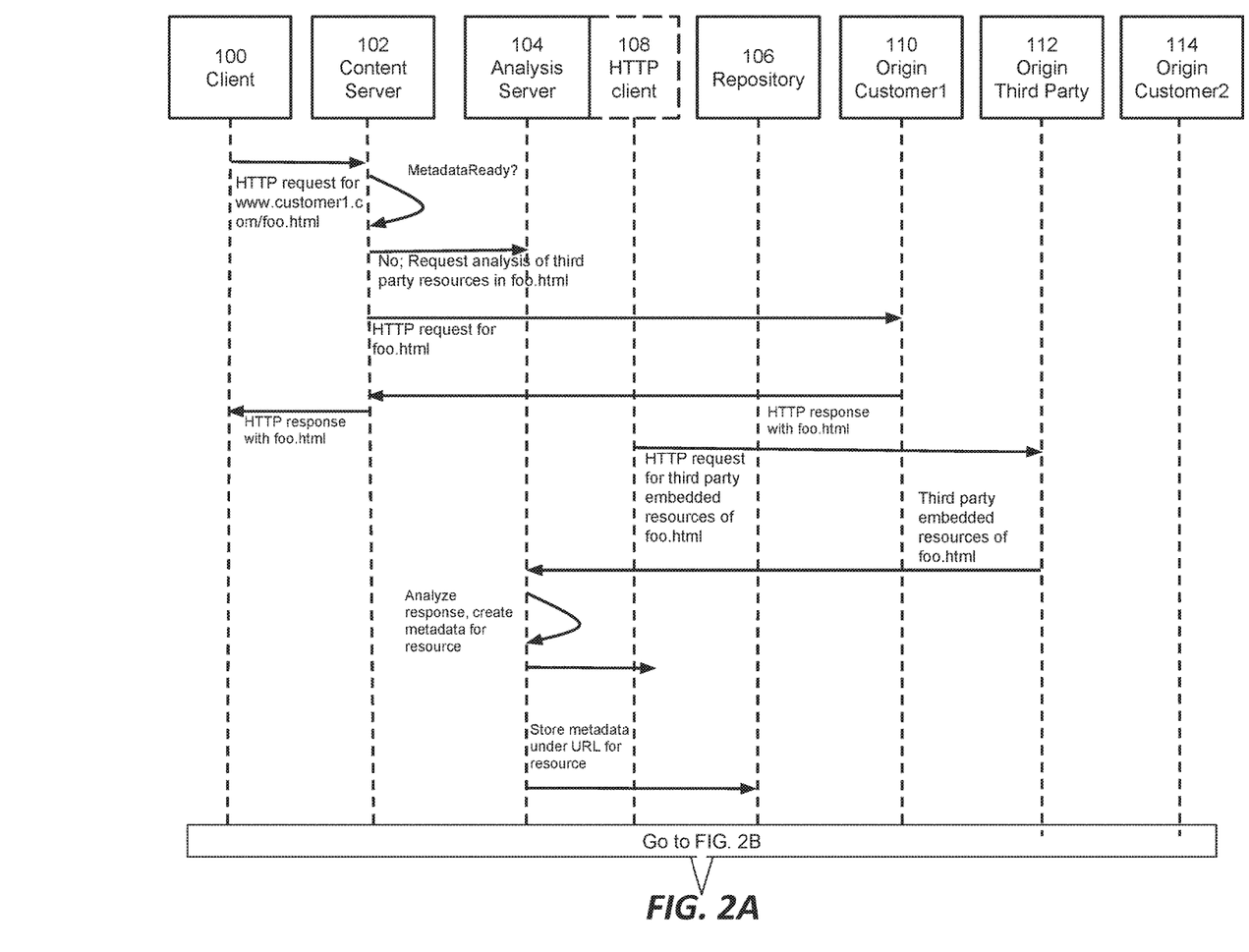
FIGS. 2A and 2B are diagrams illustrating the message flow in the system of FIG. 1, in one embodiment.
Figure 2B:
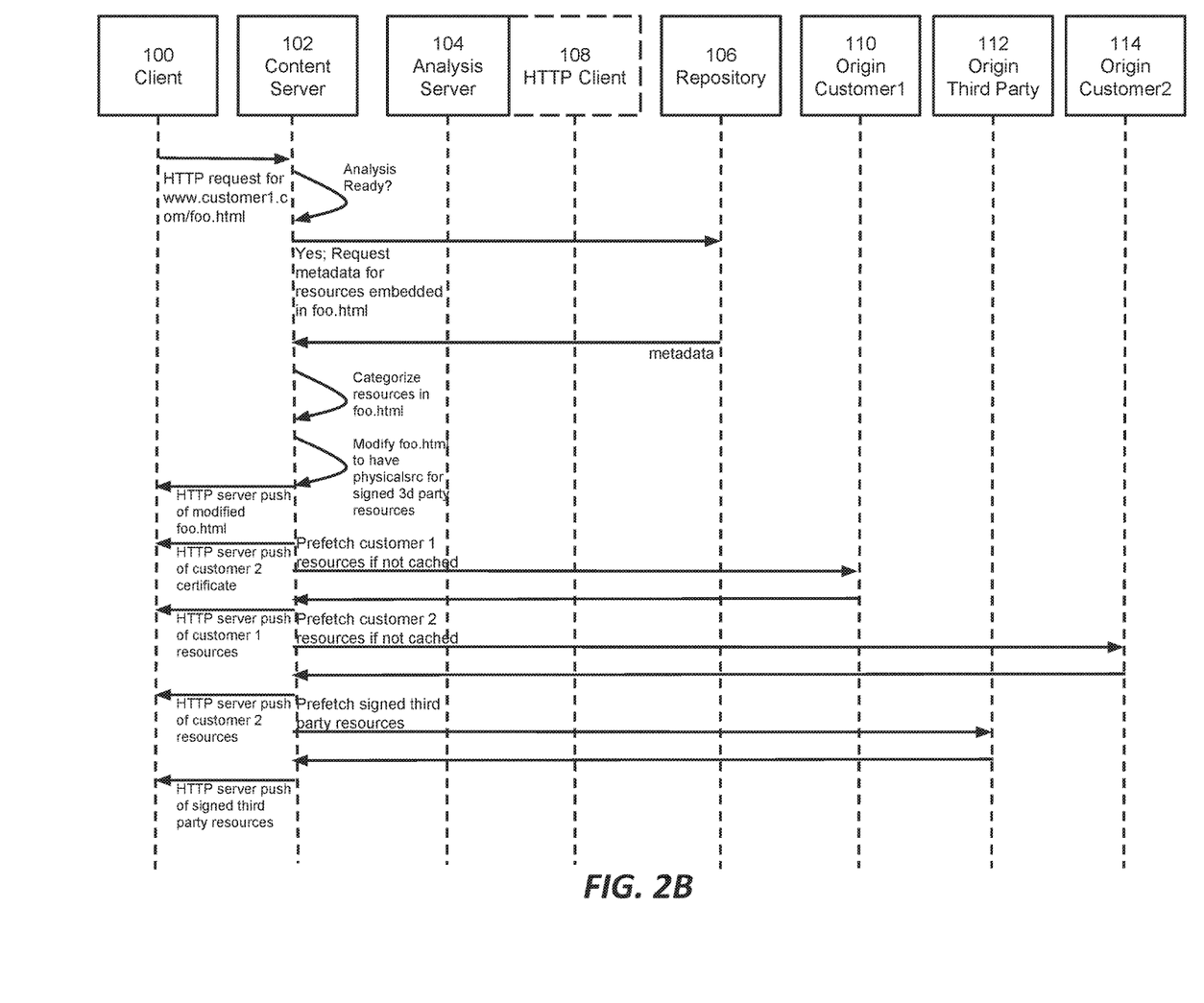

FIGS. 2A-2B are sequence diagrams illustrating one embodiment of the messaging flow in the system of FIG. 1, as just described. FIG. 2A illustrates the messaging amongst components in the system where the third party embedded resources (potential category 3) in the HTML document (foo.html) have not yet been analyzed by the offline system 104 to see if the category 3 conditions are met. FIG. 2B illustrates the messaging in the system when the analysis has been completed and is ready for content server 102 to use in response to a subsequent client requests.

Figure 3:
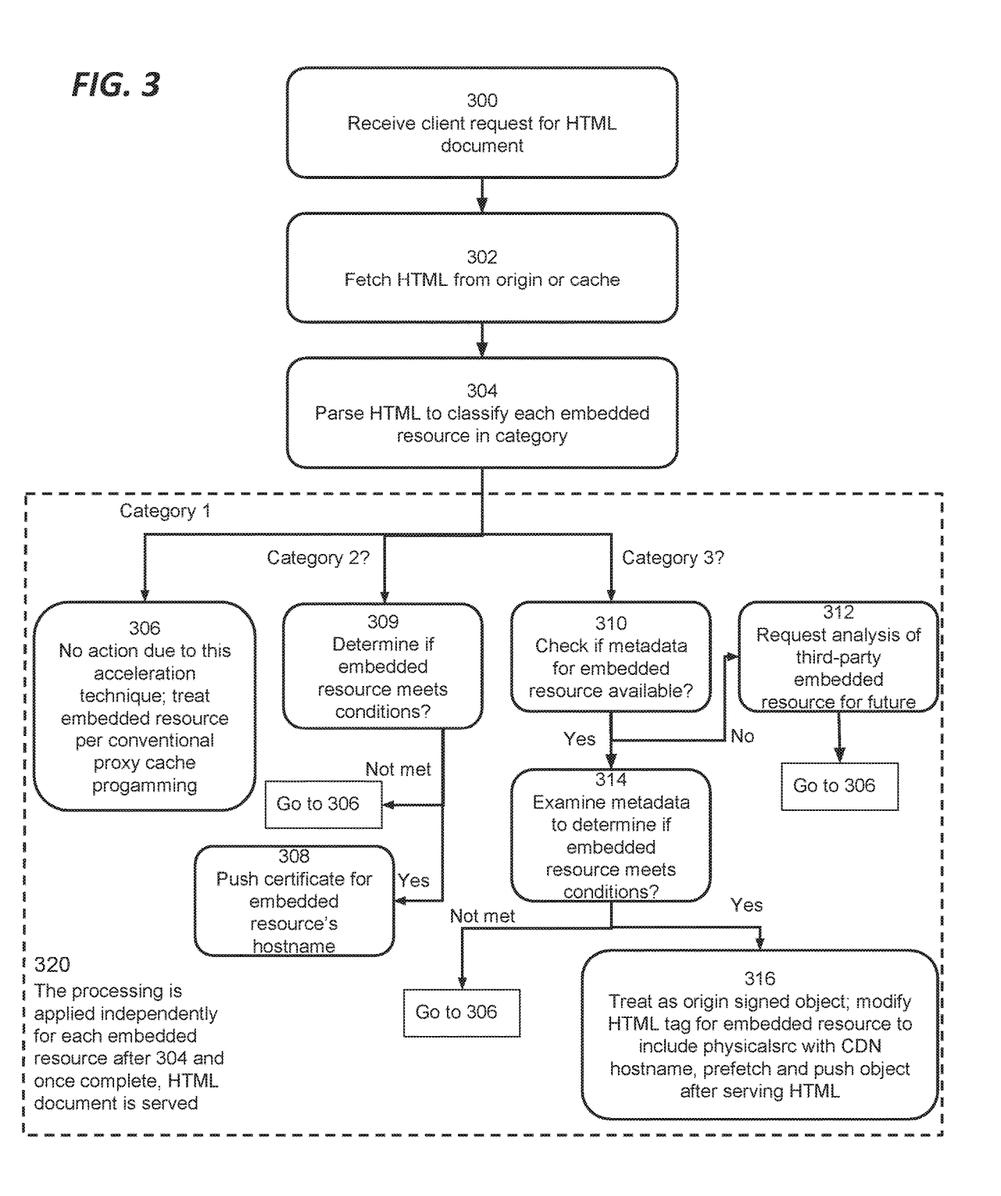
FIG. 3 is a flow diagram illustrating steps performed by content server 102 shown in FIG. 1; in one embodiment.

FIG. 3 is a flow diagram of the operation of the content server 102, as described above. In FIG. 3, it is shown that the content server 102's processing of the embedded resources proceeds for each embedded resource in the HTML document (or each of some subset thereof). Hence, the steps illustrated in the dotted line box 320 are performed for each embedded resource depending on how it is classified. Also, FIG. 3 is intended to show that (at least in one embodiment) the instruction set is created and stored in the repository 106 for each third party embedded resource and retrievable independently by URL for the resource. This means that the content server 102 may receive a future client request for a different HTML document (e.g., foo-2.html) that references the same third party embedded resource as the earlier HTML document (e.g., foo.html). The content server 102 can consult the instruction set for the embedded resource regardless of the fact that it may have been created in response to a client request for foo.html.

In an alternate embodiment, the system can be changed to work on a page by page basis. This alternate embodiment is shown in FIGS. 4A-4B, which are variants of FIGS. 2A-2B.

In this embodiment, the content server 102 requests analysis of an HTML document as a whole. The analysis server 104 performs the categorization of embedded resources and then includes the instruction set with a bundle of instructions on what to do for each embedded resource in the HTML document, e.g., following the same logic described above for each category of resource. Further, in the offline analysis, the analysis server 104 can proceed to (where applicable) modify the HTML links for qualifying third party resources to include the 'physicalsrc' attribute and can prefetch those resource into the CDN. Subsequently, a content server 102 receiving a request for the same document (e.g., foo.html) can retrieve not only the instruction set about how to handle the HTML document and embedded resources, but also the modified HTML document with the modified attributes. The content server 102 can cache the instruction set for the HTML document and modified MAIL for future use.

Figure 4A:
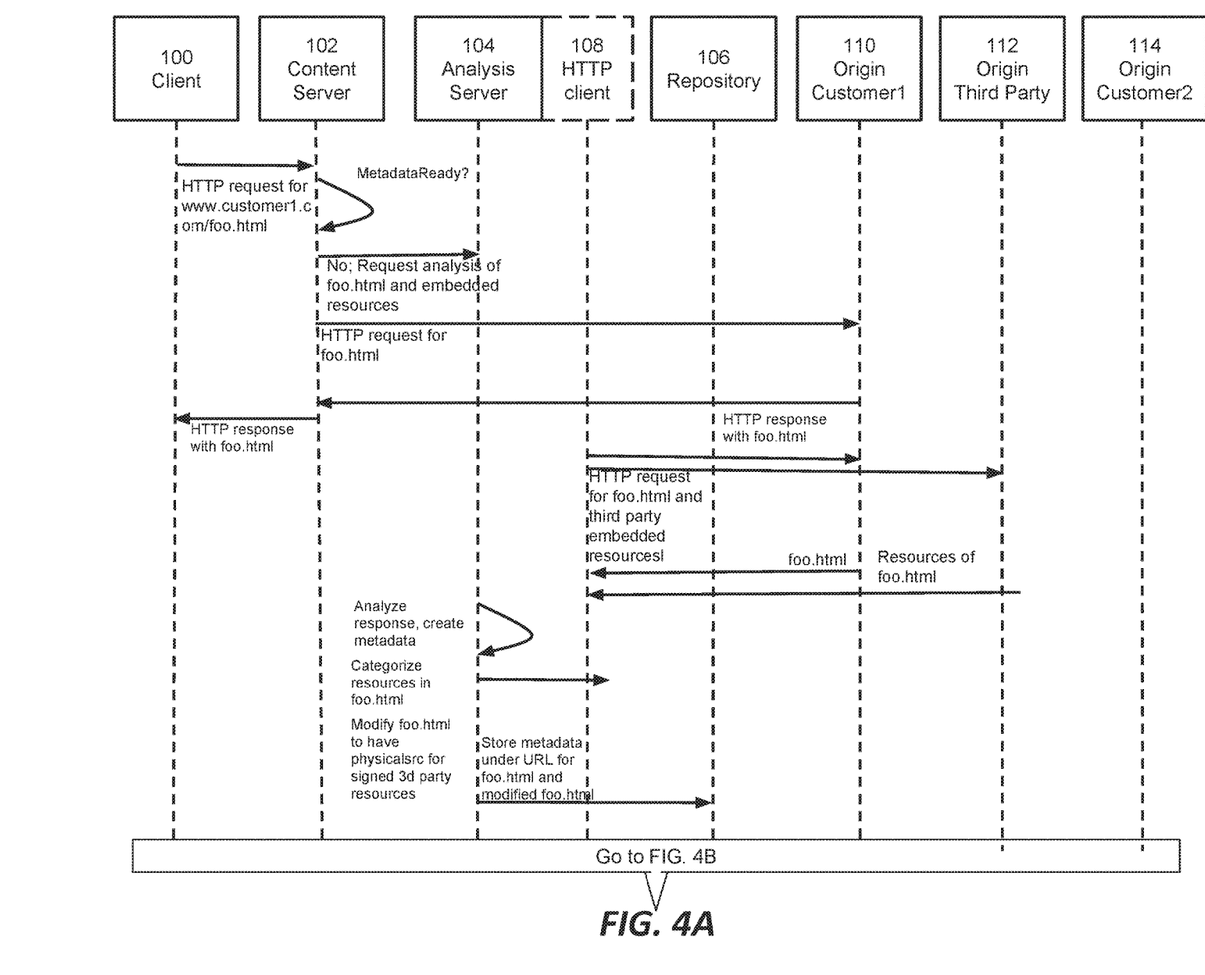
FIGS. 4A and 4B are diagrams illustrating the message flow in the system of FIG. 1, in another embodiment.
Figure 4B:
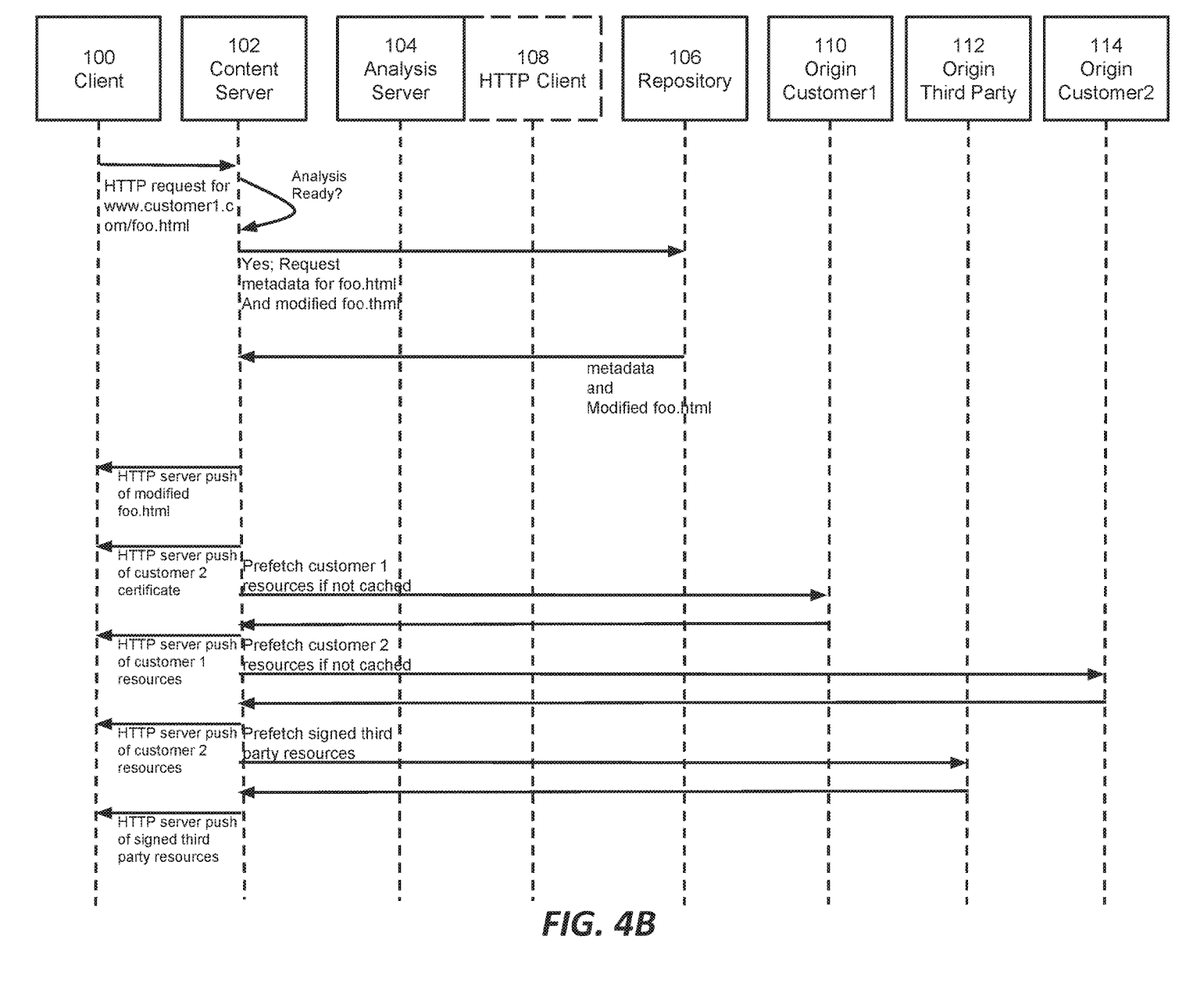

In a variant of FIGS. 4A and 4B, if no instruction set is available for the HTML document, the content server 102 can fetch HTML from the origin 112 and send it to the analysis server 104 for real-time suggestions on how to handle, including, e.g., modifications to make in terms of adding the 'physicalsrc' or other attribute/information to the HTML.

Use in Content Delivery Networks

As noted above, the teachings hereof may be implemented in a system in which the content server 102 in FIG. 1 is a server in a CDN. A description of a conventional CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 5:
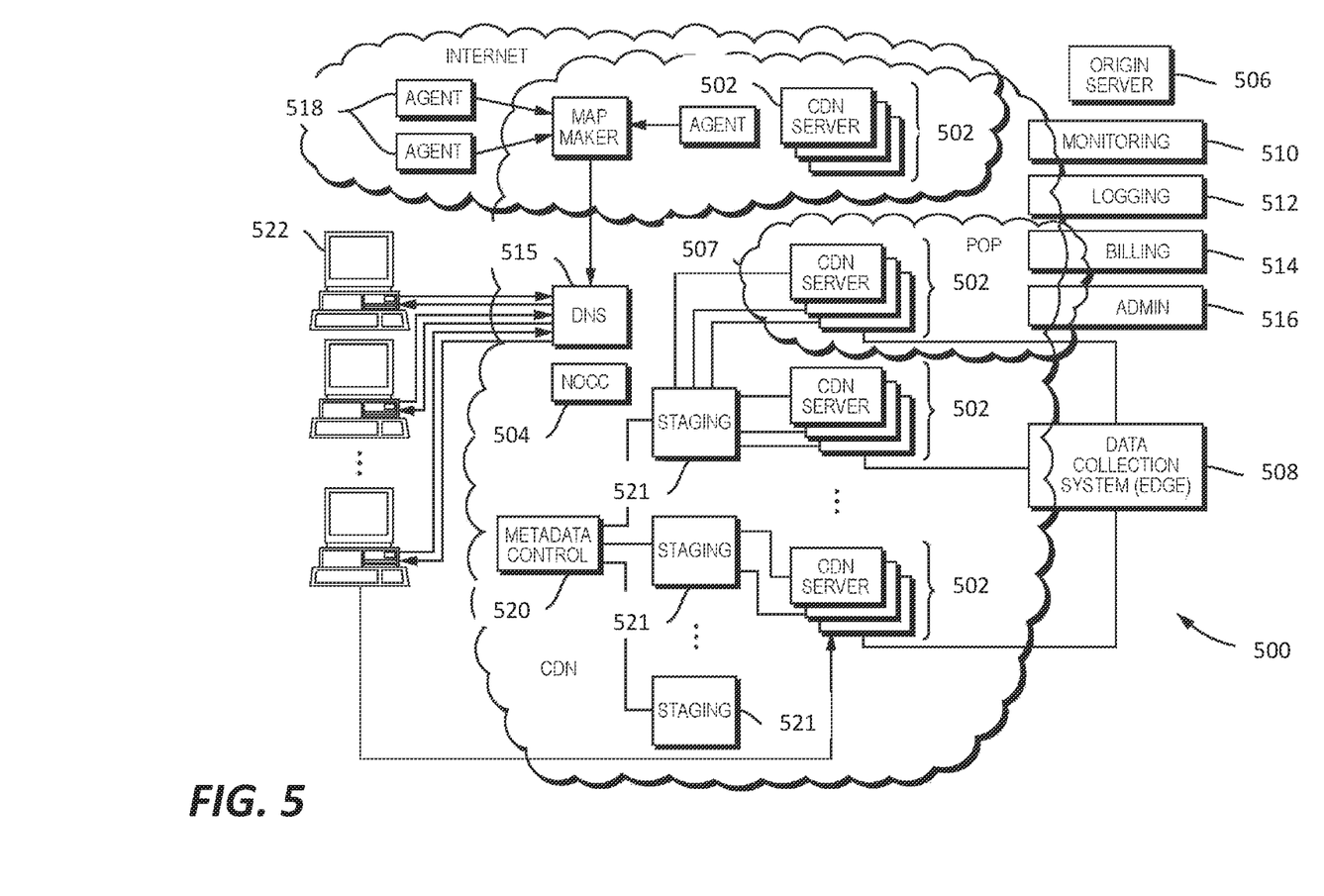
FIG. 5 is a high-level diagram of an embodiment of the content delivery network (CDN) in which the teachings hereof may be implemented.

In a known system such as that shown in FIG. 5, a distributed computer system 500 is configured as a content delivery network (CDN) and is assumed to have a set of machines 502 distributed around the Internet. The machines 502 are servers and can be the content server 102 in FIG. 1. Typically, most of the machines are configured as servers and located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects, streaming media, software downloads, and the like) to the distributed computer system 500 and, in particular, to the servers 502 (which are sometimes referred to as content servers, or sometimes as "edge" servers in light of the possibility that they are near an "edge" of the Internet). Such servers may be grouped together into a point of presence (POP) 507.

Typically, content providers offload their content delivery by aliasing (e.g., by a DNS CNAME) given content provider domains or sub-domains to domains that are managed by the service provider's authoritative domain name service. End user client machines 522 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 5, the distributed computer system may also include other infrastructure, such as a distributed data collection system 508 that collects usage and other data from the CDN servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or valiant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 502 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may, comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
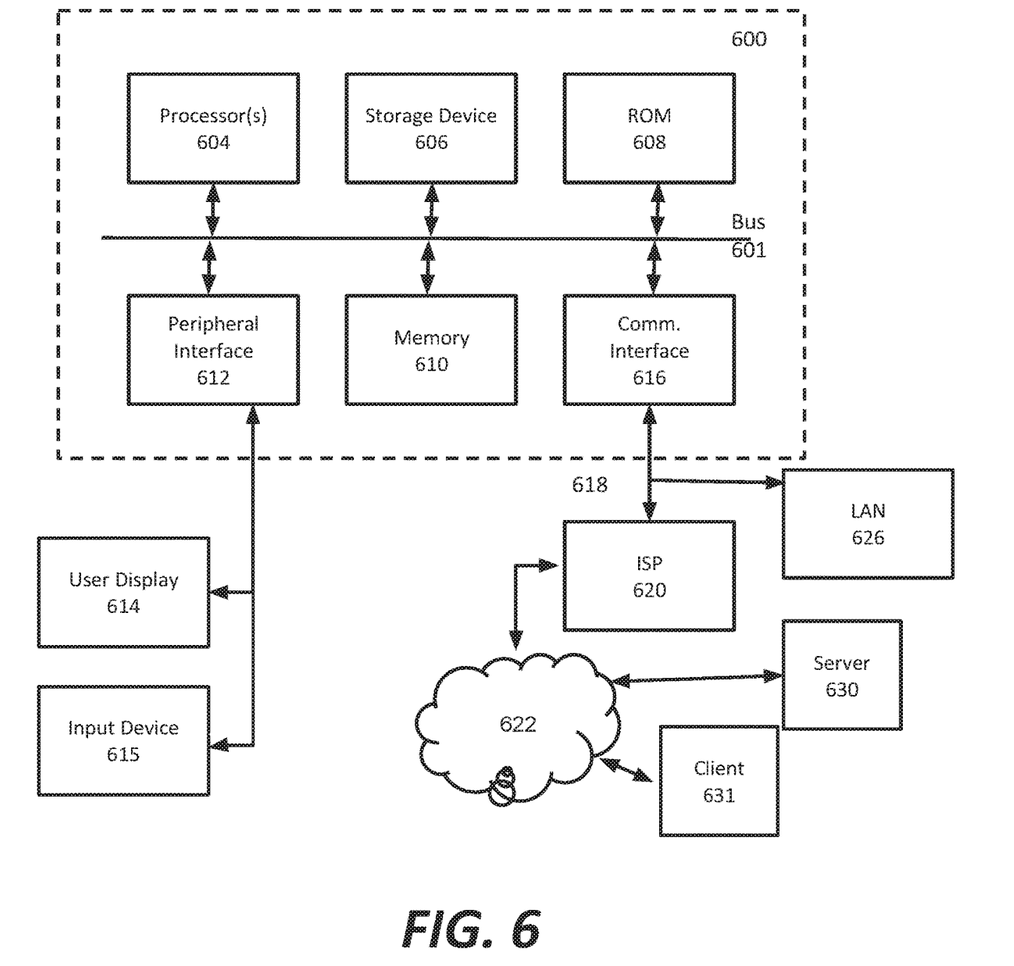
FIG. 6 is a block diagram illustrating hardware in a computer system that may be used to implement the teachings hereof.

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 communicatively couples computer system 600 to a user display 614 that displays the output of software executing on the computer system, and an input device 615 (e.g., a keyboard, mouse, trackpad, touchscreen) that communicates user input and instructions to the computer system 600. The peripheral interface 612 may include interface circuitry, control and/or level-shifting logic for local buses such as RS-485, Universal Serial Bus (USB), IEEE 1394, or other communication links.

Computer system 600 is coupled to a communication interface 616 that provides a link (e.g., at a physical layer, data link layer) between the system bus 601 and an external communication link. The communication interface 616 provides a network link 618. The communication interface 616 may represent a Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 608, or storage device 606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 618 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method of improving the delivery of resources embedded in a markup language document, the method performed by one or more servers in a content delivery network that is authoritative for a plurality of hostnames, the method comprising:

receiving, via an HTTP connection, a request from a client for a markup language document, the request directed to a first URL comprising a first hostname;

wherein the HTTP connection comprises HTTP over a transport layer protocol;

fetching the markup language document from a first origin server;

analyzing the markup language document, comprising:

parsing the markup language document to find a first embedded resource identified by a second URL comprising a second hostname and to find a second embedded resource identified by a third URL comprising a third hostname;

determining whether the content delivery network is authoritative for delivery of content under the second hostname;

determining whether the content delivery network is authoritative for delivery of content under the third hostname;

when it is determined that the content delivery network is authoritative for delivery of content under the second hostname, and based at least in part on said determination, pushing a certificate for the second hostname to the client over the HTTP connection;

when it is determined that the content delivery network is not authoritative for delivery of content under the third hostname, and based at least in part on said determination:

modifying the markup language document to include an attribute for the second embedded resource that points to a fourth hostname for which the content delivery network is authoritative for delivery of content, the attribute indicating that the client may request the second embedded resource from the content delivery network, and serving the modified markup language document to the client in response to the request, over the HTTP connection, sending a message to the client indicating that the client may request the second embedded resource from the fourth hostname; and, wherein, based at least in part on the determination that the content delivery network is not authoritative for delivery of content under the third hostname, and based at least in part on the second embedded resource meeting one or more conditions, fetching the second embedded resource from a second origin server and pushing the second embedded resource to the client over the HTTP connection along with a signature from the second origin server authenticating the second embedded resource.

2. The method of claim 1, wherein the one or more servers perform the analysis of the markup language document asynchronously to the request from the client.

3. The method of claim 1, further comprising:
testing whether the second embedded resource meets the one or more conditions, the one or more conditions comprising at least one of:
(i) the second embedded resource has a time to live (TTL) attribute that exceeds a threshold value,
(ii) the second embedded resource has a cache attribute that permits caching at a shared cache, and,
(iii) in response to a request for the second embedded resource, the second origin server serves the second embedded resource without a cookie.

4. The method of claim 1, further comprising sending the client a certificate for the first hostname over the HTTP connection, prior to receiving the request from the client.

5. The method of claim 1, wherein the determination of the content delivery network being authoritative for delivery of content under a given hostname comprises determining whether the content delivery network has a valid, signed certificate for use with TLS that applies to the given hostname.

6. The method of claim 1, wherein said pushing of the certificate for the second hostname to the client over the HTTP connection is also based at least in part on at least one of:
(i) a determination that content responsive to the request of the client is allowed to be served in a country where the request originated,
(ii) a determination that a content delivery network server receiving the request over the HTTP connection from the client has permission to serve content responsive to the request of the client,
(iii) a determination that a configuration for a TLS cipher profile stored in the content delivery network permits the content delivery network to advertise support for the first hostname to be coalesced onto another HTTP connection, and (iv) a determination that the second hostname is associated with a configuration that is stored in the content delivery network and that is for a content provider customer of the content delivery network.

7. The method of claim 1, wherein the transport layer protocol is any of TCP and QUIC.

8. A method of improving the delivery of resources embedded in a markup language document, the method performed by one or more servers in a content delivery network that is authoritative for a plurality of hostnames, the method comprising:

receiving, via an HTTP connection, a request from a client for a markup language document, the request directed to a first URL comprising a first hostname;

wherein the HTTP connection comprises HTTP over a transport layer protocol;

fetching the markup language document from a first origin server;

analyzing the markup language document, comprising:
parsing the markup language document to find a first embedded resource identified by a second URL comprising a second hostname and to find a second embedded resource identified by a third URL comprising a third hostname;
determining whether the content delivery network is authoritative for delivery of content under the second hostname;
determining whether the content delivery network is authoritative for delivery of content under the third hostname;

when it is determined that the content delivery network is authoritative for delivery of content under the second hostname, and based at least in part on said determination, pushing a certificate for the second hostname to the client over the HTTP connection;

when it is determined that the content delivery network is not authoritative for delivery of content under the third hostname, and based at least in part on said determination, and based at least in part on the second embedded resource meeting one or more conditions, fetching the second embedded resource from a second origin server and pushing the second embedded resource to the client over the HTTP connection along with a signature from the second origin server authenticating the second embedded resource; and, the method further comprising:
testing whether the second embedded resource meets the one or more conditions, the one or more conditions comprising all of:
(i) the second embedded resource has a time to live (TTL) attribute that exceeds a threshold value,
(ii) the second embedded resource has a cache attribute that permits caching at a shared cache, and,
(iii) in response to a request for the second embedded resource, the second origin server serves the second embedded resource without a cookie.

9. A system of for delivery of resources embedded in a markup language document, the system comprising one or more servers in a content delivery network (CDN) that is authoritative to deliver content for a plurality of hostnames, the system comprising:

A. a server in the content delivery network, the server comprising circuitry forming at least one processor and memory holding program instructions for execution on the at least one processor, the program instructions including instructions for the server to:

(i) receive, via an HTTP connection, a request from a client for a markup language document, the request directed to a first URL comprising a first hostname;
(ii) wherein the HTTP connection comprises HTTP over a transport layer protocol;
(iii) fetch the markup language document from a first origin server;
(iv) analyze the markup language document, the analysis comprising:
   (a) parsing the markup language document to find a first embedded resource identified by a second URL comprising a second hostname and to find a second embedded resource identified by a third URL comprising a third hostname;
   (b) determining whether the content delivery network is authoritative for delivery of content under the second hostname;
   (c) determining whether the content delivery network is authoritative for delivery of content under the third hostname;
B. the program instructions further including instructions for the server to:
   (i) based at least in part upon a determination that the content delivery network is authoritative for delivery of content under the second hostname, pushing a certificate for the second hostname to the client over the HTTP connection; and
   (ii) based at least in part upon a determination that the content delivery network is not authoritative for delivery of content under the third hostname:
      modify the markup language document to include an attribute for the second embedded resource that points to a fourth hostname for which the content delivery network is authoritative, the attribute indicating that the client may request the second embedded resource from the content delivery network, and serve the modified markup language document to the client in response to the request, over the HTTP connection,
      send a message to the client indicating that the client may request the second embedded resource from the fourth hostname, and,
      based at least in part on the determination that the content delivery network is not authoritative for delivery of content under the third hostname, and based at least in part on the second embedded resource meeting one or more conditions, fetch the second embedded resource from a second origin server and push the second embedded resource to the client over the HTTP connection along with a signature from the second origin server authenticating the second embedded resource.

10. The system of claim 9, the program instructions further including instructions for the server to:
test whether the second embedded resource meets the one or more conditions, the one or more conditions comprising at least one of:
(i) the second embedded resource has a time to live (TTL) attribute that exceeds a threshold value,
(ii) the second embedded resource has a cache attribute that permits caching at a shared cache, and,
(iii) in response to a request for the second embedded resource, the second origin server serves the second embedded resource without a cookie.

11. The system of claim 9, the program instructions further including instructions for the server to: send the client a certificate for the first hostname over the HTTP connection, prior to receiving the request from the client.

12. The system of claim 9, wherein the determination of the content delivery network being authoritative for delivery of content under a given hostname comprises determining whether the content delivery network has a valid, signed certificate for use with TLS that applies to the given hostname.

13. The system of claim 9, wherein said pushing of the certificate for the second hostname to the client over the HTTP connection is also based at least in part on at least one of:
   (i) a determination that content responsive to the request of the client is allowed to be served in a country where the request originated,
   (ii) a determination that a content delivery network server receiving the request over the HTTP connection from the client has permission to serve content responsive to the request of the client,
   (iii) a determination that a configuration for a TLS cipher profile stored in the content delivery network permits the content delivery network to advertise support for the first hostname to be coalesced onto another HTTP connection, and
   (iv) a determination that the second hostname is associated with a configuration that is stored in the content delivery network and that is for a content provider customer of the content delivery network.

14. A system of for delivery of resources embedded in a markup language document, the system comprising one or more servers in a content delivery network (CDN) that is authoritative to deliver content for a plurality of hostnames, the system comprising:
   A. a first server in the content delivery network, the first server comprising circuitry forming at least one processor and memory holding program instructions for execution on the at least one processor, the program instructions including instructions for the first server to:
      (i) receive, via an HTTP connection, a request from a client for a markup language document, the request directed to a first URL comprising a first hostname;
      (ii) wherein the HTTP connection comprises HTTP over a transport layer protocol; and,
      (iii) fetch the markup language document from a first origin server;
   B. a second server in the content delivery network, the second server comprising circuitry forming at least one processor and memory holding program instructions for execution on the at least one processor, the program instructions including instructions for the second server to:
      (i) analyze the markup language document, the analysis comprising:
         (a) parsing the markup language document to find a first embedded resource identified by a second URL comprising a second hostname and to find a second embedded resource identified by a third URL comprising a third hostname;
         (b) determining whether the content delivery network is authoritative for delivery of content under the second hostname; and,
         (c) determining whether the content delivery network is authoritative for delivery of content under the third hostname;
   C. the program instructions that are held in the memory of the first server further including instructions for the first server to:

(i) based at least in part upon a determination that the content delivery network is authoritative for delivery of content under the second hostname, push a certificate for the second hostname to the client over the HTTP connection; and (ii) based at least in part upon a determination that the content delivery network is not authoritative for delivery of content under the third hostname:

modify the markup language document to include an attribute for the second embedded resource that points to a fourth hostname for which the content delivery network is authoritative, the attribute indicating that the client may request the second embedded resource from the content delivery network, and serve the modified markup language document to the client in response to the request, over the HTTP connection, and send a message to the client indicating that the client may request the second embedded resource from the fourth hostname; and, (iii) based at least in part on the determination that the content delivery network is not authoritative for delivery of content under the third hostname, and based at least in part Oil the second embedded resource meeting one or more conditions, fetching the second embedded resource from a second origin server and pushing the second embedded resource to the client over the HTTP connection along with a signature, from the second origin server authenticating the second embedded resource.

15. The system of claim 14, the program instructions held in the memory of the second server further including instructions for the second server to:

test whether the second embedded resource meets the one or more conditions, the one or more conditions comprising at least one of:

(i) the second embedded resource has a time to live (TTL) attribute that exceeds a threshold value, (ii) the second embedded resource has a cache attribute that permits caching at a shared cache, and, (iii) in response to a request for the second embedded resource, the second origin server serves the second embedded resource without a cookie.

16. The system of claim 14, the program instructions held in the memory of the first server further including instructions for the first server to: send the client a certificate for the first hostname over the HTTP connection, prior to receiving the request from the client.

17. The system of claim 14, wherein the determination of the content delivery network being authoritative for delivery of content under a given hostname comprises determining whether the content delivery network has a valid, signed certificate for use with TLS that applies to the given hostname.

18. The system of claim 14, wherein said pushing of the certificate for the second hostname to the client over the HTTP connection is also based at least in part on at least one of the following, determined by the first server:

(i) a determination that content responsive to the request of the client is allowed to be served in a country where the request originated, (ii) a determination that a content delivery network server receiving the request over the HTTP connection from the client has permission to serve content responsive to the request of the client, (iii) a determination that a configuration for a TLS cipher profile stored in the content delivery network permits the content delivery network to advertise support for the first hostname to be coalesced onto another HTTP connection, and (iv) a determination that the second hostname is associated with a configuration that is stored in the content delivery network and that is for a content provider customer of the content delivery network.

* * * * *